(12) United States Patent
Rangarjan et al.

(10) Patent No.: US 7,366,098 B1
(45) Date of Patent: Apr. 29, 2008

(54) METHOD AND APPARATUS FOR INPUT POLICING A NETWORK CONNECTION

(75) Inventors: Raja Rangarjan, Sunnyvale, CA (US); Ashish Gupta, Fremont, CA (US); Rohit Sharma, Sunnyvale, CA (US); Naresh Kumar Sharma, San Jose, CA (US); Frederic Mathieu, Boucherville (CA); Jayakumar Jayakumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1046 days.

(21) Appl. No.: 10/222,275

(22) Filed: Aug. 15, 2002

(51) Int. Cl.
*H04L 12/26* (2006.01)
*H04J 3/14* (2006.01)
*G08C 15/00* (2006.01)
*G06F 11/00* (2006.01)

(52) U.S. Cl. .................. 370/235; 370/230; 370/415; 370/426

(58) Field of Classification Search ........ 370/229–235, 370/389–395, 422–426; 709/223–229
See application file for complete search history.

(56) References Cited

U.S. PATENT DOCUMENTS

| | | | | |
|---|---|---|---|---|
| 5,315,591 A * | 5/1994 | Brent et al. | ................ | 370/235 |
| 5,343,465 A * | 8/1994 | Khalil | ................ | 370/232 |
| 5,412,647 A * | 5/1995 | Giroux et al. | ................ | 370/232 |
| 6,031,843 A * | 2/2000 | Swanbery et al. | ................ | 370/426 |
| 6,370,116 B1* | 4/2002 | Giroux et al. | ................ | 370/232 |
| 6,452,933 B1* | 9/2002 | Duffield et al. | ................ | 370/415 |
| 6,542,508 B1* | 4/2003 | Lin | ................ | 370/395.43 |
| 6,618,356 B1* | 9/2003 | Bonaventure | ................ | 370/235 |
| 6,636,480 B1* | 10/2003 | Walia et al. | ................ | 370/229 |
| 2001/0036157 A1* | 11/2001 | Blanc et al. | ................ | 370/235 |
| 2002/0089929 A1* | 7/2002 | Talleges et al. | ................ | 370/230 |
| 2002/0116521 A1* | 8/2002 | Paul et al. | ................ | 709/233 |
| 2002/0181397 A1* | 12/2002 | Licht | ................ | 370/230 |

OTHER PUBLICATIONS

International Telecommunication Union, CCITT, Integrated Services Digital Network (ISDN).
Magement For The ISDN Frame Relaying Bearer Service Recommendation 1.370, Geneva, 1991, 12 pages.

* cited by examiner

*Primary Examiner*—Man U. Phan
(74) *Attorney, Agent, or Firm*—Blakely, Sokoloff, Taylor & Zafman LLP

(57) ABSTRACT

A method is described that resets a first count and resets a second count if a first transmission unit is recognized as being within a new measurement time window. The first transmission unit has a size. The method also increments the first count by the first transmission unit size and by the size of each subsequent transmission unit that is received within the new measurement time window after the first transmission unit—so long as the first count does not exceed a maximum allowable value for the first count. The method also checks if a maximum value for the second count is exceeded if it is incremented by a second transmission unit size. The second transmission unit is received within the measurement time window. The check is in response to a determination that the first count would have exceeded the first count maximum allowable valuable if the first count were incremented by the second transmission unit size.

38 Claims, 10 Drawing Sheets

METHOD AND APPARATUS FOR INPUT POLICING A NETWORK CONNECTION

FIELD OF INVENTION

The field of invention relates generally to networking; and, more specifically, to a method and apparatus for input policing a network connection.

BACKGROUND

Transmitted units of data (e.g., cells, packets, frames) are typically "policed" upon their entrance to a network. Often, the transmitted units of data are associated with a particular connection or other parameter (e.g., source node or port identification, destination node or port information, combination of source/destination identification information, etc.) that can be traced to a particular rate of service that the network is designed to offer an entity (e.g., a user, another network, equipment, etc.) that sent the transmitted unit of data to the network. For example, in the case of a Frame Relay network, a connection with a particular rate of service (e.g., as measured in bytes/sec) may be established; and, the frames that are offered to the Frame Relay network for transport over the connection are expected to arrive to the Frame Relay network at a rate that is approximately "in compliance" with the rate of service of the connection.

To the extent that the entity that is sending the frames for the particular connection sends the frames to the network at a rate that is approximately the same as the service rate of the connection, the Frame Relay network is expected to allow the frames to be carried by the network over the connection. However, if frames begin to arrive at a rate that exceeds the service rate of the connection, the network is allowed to "drop" the frames (or carry them only on a best effort basis, etc.). That is, the network is designed to thwart service as the offered rate exceeds the rate that has been established for the connection. The activity of thwarting or not thwarting service based upon the offered rate is often referred to as "policing", "input policing" and the like.

FIG. 1 shows a diagram 100 that describes a basic input policing algorithm. The particular diagram 100 of FIG. 1 describes an input policing scheme that is described in the International Telecommunications Union (ITU) I.370 standard "Congestion Management For The ISDN Frame Relaying Bearer Service". According to the approach of FIG. 1, the amount of data that arrives for a discrete amount of time Tc (which may be referred to as "the window of time Tc", "the time window", "the window of time", "the measurement window", "the measurement time window", "the measurement time window size", "the measurement interval" and the like) is tracked. If the amount of data that arrives within the window of time is less than or equal to a committed burst (Bc), the data is allowed to be carried by the network. As such, the data rate cir=Bc/Tc corresponds to the committed data rate that is associated for the connection.

According to the approach of FIG. 1, if an excess burst (Be) amount of data beyond Bc arrives within the time window (such that the total amount of data to arrive within time window Tc is less than or equal to Bc+Be) the one or more frames that carry data beyond Bc are tagged as Discard Eligible (DE) (e.g., by activating a bit in a frame header). When a frame is marked as discard eligible it is effectively labeled as being not in compliance with the service rate of its particular connection. However, marking a packet as non conforming with respect to the service rate of its connection (rather than discarding it immediately) allows the network to grant some degree of forgiveness. For example, the packet may be handled on a "best effort basis" wherein, if any excess/unused bandwidth capacity is available to carry the frame, the frame will be allowed to be forwarded for transport through the network with the excess/unused bandwidth.

If an amount of data beyond Be+Bc arrives within the time window, the one or more frames that carry data beyond Be+Bc are discarded. Here, for frames that represent an offered rate in excess of Bc+Be within the time window, no forgiveness is provided. The Bc data quantity is often referred to as the "committed burst" (because the connection is committed to carrying a rate of cir=Bc/Tc); and, the Be data quantity is often referred to as the "excess burst" (because the connection will forgive, by marking as discard eligible rather than discarding, those frames that represent an excess offered rate of Be/Tc beyond Bc/Tc). A problem with prior art attempts to implement the above described algorithm is their failure to comply with its basic principles.

In particular, the algorithm described above should force a separate analysis for each recognized window of time Tc; but, as described in more detail below, the known prior art solution does not operate in this manner. FIG. 2a shows a depiction of the known prior art approach (referred to as a "leaky bucket" approach) that has previously been used to implement the I.370 policing policy. Here, a poling unit 200 is implemented with a queue that is serviced according to a pair of queue servicing rates. Over time, the first queue servicing rate will reveal itself to be approximately equal to the committed service rate of the connection (cir=Bc/Tc); and, over time, the second queue servicing rate will reveal itself to be approximately equal to the excess service rate permitted by the connection (Be/Tc=(Be/Bc)cir).

A problem with the known prior art approach, however, is that there is no "notion" of the time Tc. That is, the functional unit responsible for measuring traffic against the committed and excess service rates implements the policing policy at time intervals other than Tc (e.g., "T"). Here, when an analysis is made (e.g., T seconds after the last analysis was made), the functional unit re-evaluates the connection by calculating: 1) "how many" bytes of received information should be serviced according to the committed service rate (i.e. (Bc/Tc)T); and, 2) "how many" bytes of received information should be "marked as discard eligible" and serviced according to the excess service rate (i.e., (Be/Tc)T). A number of received bytes equal to (Bc/Tc)T are then allowed to continue downstream without being marked as discard eligible and; and (if available) a number of bytes equal to (Be/Tc)T are allowed to continue downstream marked as discard eligible. After this, any remaining bytes are discarded.

Here, although the proper service rates will be implemented over time, because the functional unit operates according to a periodic time T and not a periodic time Tc—the precise I.370 standard is not followed. The result is an effective "spilling over", across Tc boundaries, of network resources devoted to the connection. FIG. 2b demonstrates the problem in more detail.

FIG. 2b shows a first burst of data 210 that arrives at time $t_1$; and, a second burst of data 220 that arrives at time $t_2$. For simplicity, both of data bursts 210, 220 comprise Bc+Be worth of data. Note that the phase alignment of FIG. 2b shows three synchronously spaced Tc time windows: a first that spans from t=0 to t=Tc; a second that spans from t=Tc to t=2Tc and a third that spans from t=2Tc to t=3Tc. Here, as both data bursts 210, 220 arrive in the same time window between t=Tc and t=2Tc, strict application of the I.370 standard would demand that the second data burst 220 be discarded.

However, because the known prior art method operates over a time period T (which can be assumed to be greater than Tc) both data bursts will be accepted if the subsequent Tc window (between 2Tc and 3Tc) does not receive any traffic and the next inquiry after a passing of time T arises after 3Tc. As discussed, however, strict compliance with the I.370 standard would cause the second data burst 220 to be discarded.

FIGURES

The present invention is illustrated by way of example and not limitation in the figures of the accompanying drawings, in which like references indicate similar elements, and in which.

DETAILED DESCRIPTION

Figure 1:
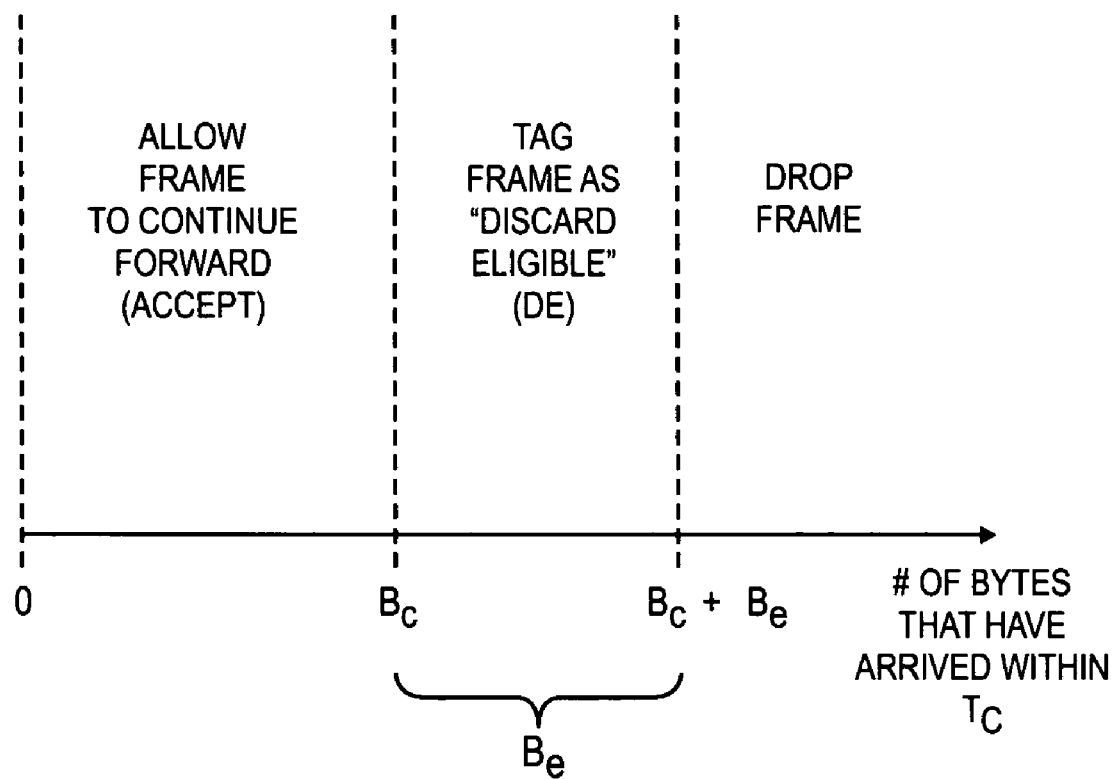
FIG. 1 shows a depiction of a basic policing algorithm of the I.370 standard.
Figure 2A:
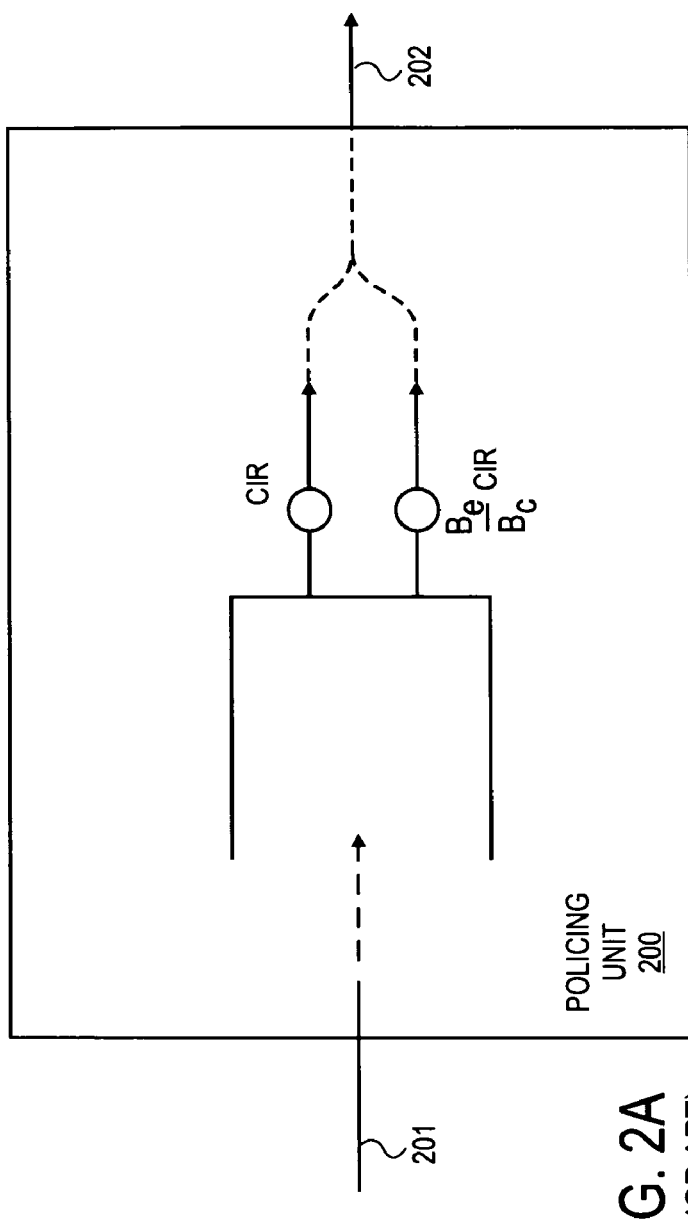
FIG. 2a shows a depiction of a policing unit that employs a leaky bucket scheme.
Figure 2B:
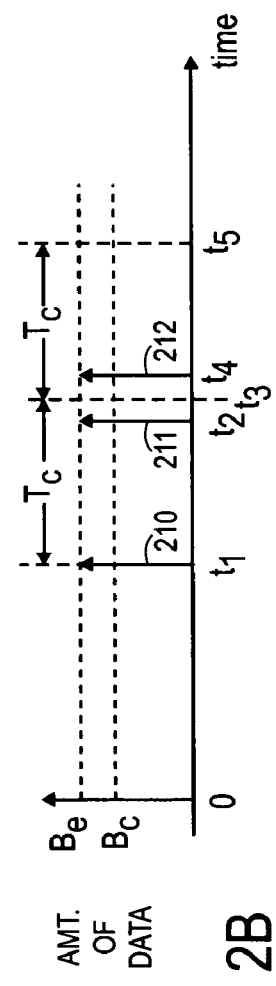
FIG. 2b shows a pair of data bursts that cause the policing unit of FIG. 2a to fail to conform to the I.370 standard.
Figure 3:
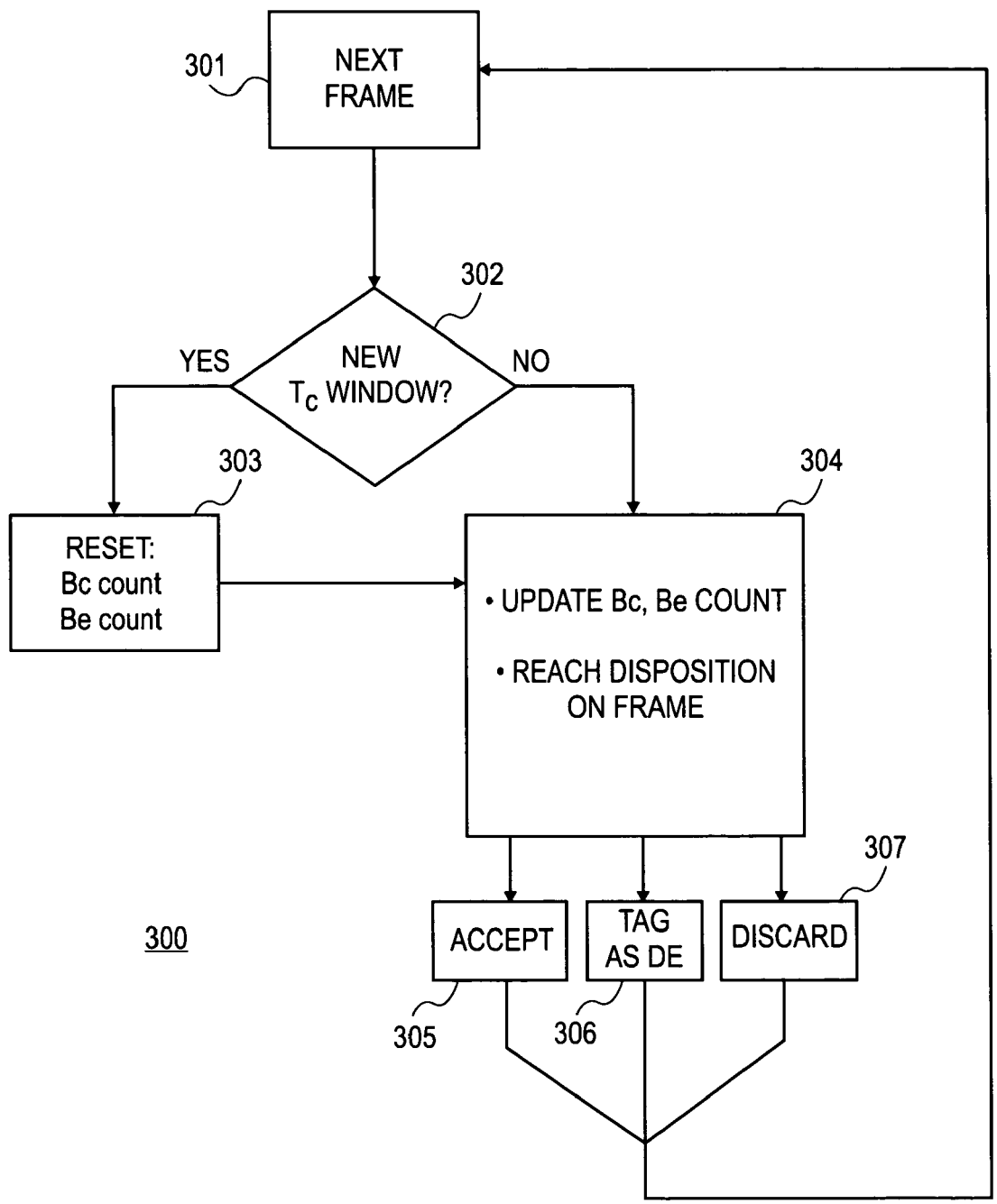
FIG. 3 shows an embodiment of a policing methodology.

A solution to the problem discussed with respect to FIGS. 2a and 2b is to implement a policing methodology that triggers an analysis of the appropriate byte count status with each new arriving frame; and, keeps track of time so that new byte counts can be re-initialized each time a frame arrival falls within a "new" Tc time window. FIG. 3 shows an embodiment of a methodology 300 that operates as described above. According to the approach of the methodology 300 of FIG. 3, whenever a new frame is received, an inquiry 302 is made into whether or not the time of arrival of the new frame corresponds to a "new" time window. If so, a Bc count and a Be count are reset 303 (e.g., Bc count=0; and, Be count=0). If not, in which a case at least one previous frame was received at or within one full time window ago, the Bc count and the Be count are not reset.

In various possible embodiments, the inquiry 305 as to whether or not the newly arrived frame belongs to a new Tc time window effectively causes a new time window to be recognized whenever a time difference greater than (or; greater than or equal to) Tc is recognized as between the arrival of a pair of frames (noting that the pair of frames do not need to be a pair of consecutive frames). In various embodiments, when such a time difference is recognized, the moment of arrival of the newly arrived frame is recorded as the start time of the "current" time window. For each subsequently received frame whose arrival time is within (or; within or at) Tc beyond the start time of the "current" time window, the answer to inquiry 302 is "NO" (because the time of arrival is before the expiration of the time window).

However, when a frame arrives whose time of arrival is after (or; at or after) Tc beyond the recorded start time of the current window, the answer to inquiry 302 is "YES" (because the time of arrival of the new frame is upon or after the expiration of the of the current time window). As such, the time of arrival of the newly arrived frame is recorded as the "new" start time of the current time window. Accordingly, resetting the start time of the "current" time window to the arrival time of the newly arrived frame can be included as part of methodology 303 (where the Bc and Be counters are reset). The approach described above allows for asynchronous time windows (because start times for new time windows are triggered upon frame arrival which can be random).

As seen in the methodology 300 of FIG. 3, regardless as to whether or not the new frame arrival is associated with a new time window or not, a disposition is made on the frame (accept 305, tag as Discard Eligible (DE) 306, or discard 307); and, the counts are incremented to reflect the arrival of the new frame 304. Here, the Bc count will be incremented by the size of the newly arrived frame if the total amount of frame data (including the data of the newly arrived frame) to have arrived during current time window was received in is less than Bc; and the disposition on the frame will be accepted 305. Alternatively, the Be count will be incremented if the size of the newly arrived frame plus the amount of frame data to have already arrived within the current window is greater than Bc but less than or equal to Be; and, the frame will be tagged as Discard Eligible 306.

Figure 4:
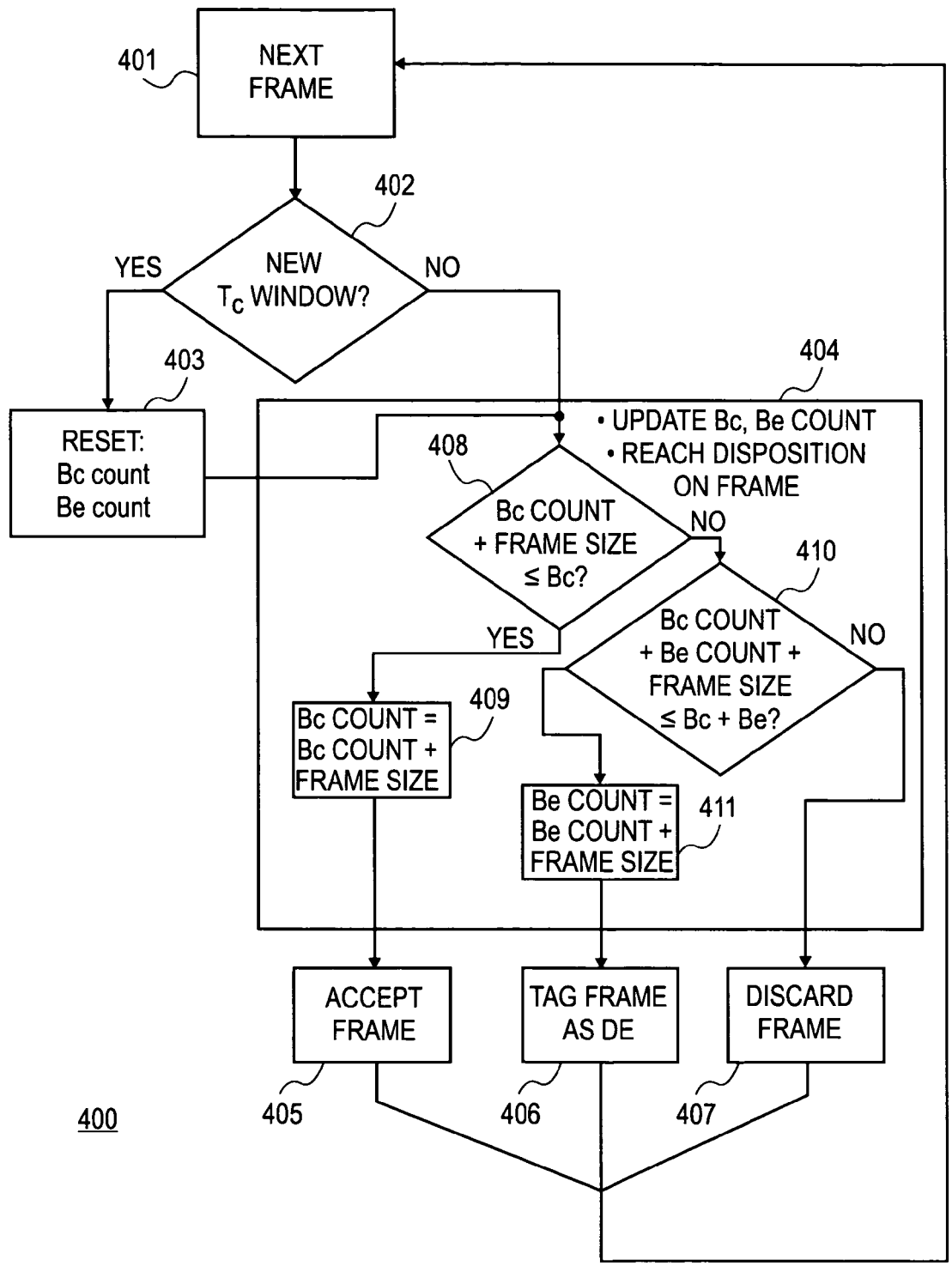
FIG. 4 shows another, more detailed embodiment of a policing methodology.

If the size of the newly arrived frame plus the amount of frame data to have already arrived within the current window is greater than Bc+Be, the frame will be tagged as Discard Eligible 306. The methodology 300 is re-executed upon the arrival of the next frame 301 for the connection. FIG. 4 shows a more detailed embodiment of a policing methodology 400 that can be viewed as one embodiment of the broader embodiment that was just discussed above with respect to FIG. 3. Here, the counter update and frame disposition methodology 404 of FIG. 4 shows another inquiry 408 that checks to see if the summation of the size of the newly arrived frame and the current value of the Bc count is less than or equal to Bc. If so, the newly arrived frame is effectively recognized as being part of the committed service rate of the connection; and, the Bc count is incremented 409 by the size of the newly arrived frame and the frame is accepted 405.

By contrast, if the answer to inquiry 408 is "NO", a further inquiry 410 is made to see if the summation of the size of the newly arrived frame, the current value of the Bc count and the current value of the Be count is less than or equal to Bc+Be. If so, the frame is recognized as being part of the excess service rate that is permitted by the connection; and, the Be count is incremented 411 by the size of the newly arrived frame and the frame is tagged 406 as Discard Eligible. If the answer to the further inquiry 410 is "NO", the frame is recognized as being associated with an offered load that is beyond the connection's permitted excess rate; and, the frame is discarded 407. In this case, the Bc count and Be count are not incremented.

Figure 5:
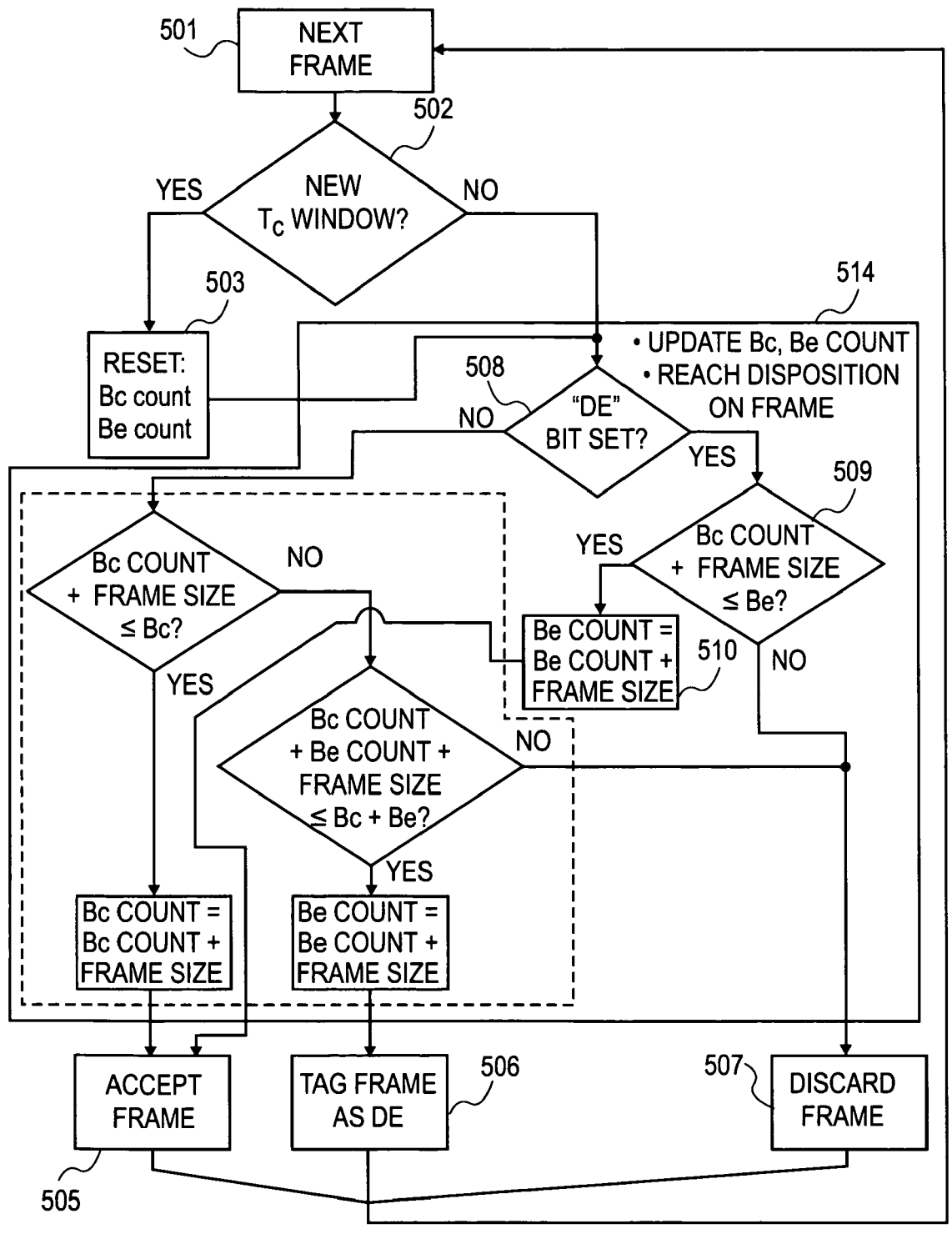
FIG. 5 shows an embodiment of a policing methodology that applies the permissible excess bandwidth of a connection to a frame that has been tagged as discard eligible.

FIG. 5 shows an even more detailed embodiment that provides additional functionality for the handling an incoming frame that has already been tagged as being discard eligible. Note that it is possible for a policing function to receive a frame that has already been tagged as discard eligible. For example, to illustrate just a few examples, a policing function can receive a "DE" frame if policing is utilized deeper within the network along the connection path (e.g., further along the connection path than just the access point to the network where the frame's data was first received); or, if another network that previously handled the data being carried by the frame marked it as being eligible for discard (e.g., because a policy of the preceding network was not complied with).

In order to account for the treatment of frames that have already been marked as discard eligible, an additional inquiry is added to the count update and frame disposition methodology. As such, the count update and frame disposition methodology 514 of FIG. 5 includes an inquiry 508 that checks to see if the newly arrived frame has already been marked as Discard Eligible. If not, a methodology 504 that is identical to the count update and frame disposition methodology 404 of FIG. 4 is executed. If the newly arrived frame has been tagged as discard eligible (in which case the answer to inquiry 508 is "YES"), another inquiry 509 is made that verifies whether or not the size of the newly arrived frame in addition to the current value of the Be count corresponds to a value that is less than or equal to Be. If so, the Be count is incremented 510 by the size of the frame and the frame is accepted 505 (and, in an embodiment, the frame keeps its DE tag). If not, the frame is discarded 507.

Note that, because newly arrived frames that have already been tagged as Discard Eligible are policed 509 in light of the Be count (and their acceptance increments 510 the Be count), such frames are treated within the current Tc window "as if" Bc worth of frame data has already been received within the current time window—even if no data has actually been received within the current time window. Better said, a frame that has already been tagged as Discard Eligible is "kept within" the excess service rate of the connection, rather than consume resources associated with the connection's committed service rate. Keeping frames already labeled as discard eligible within the excess service rate of the connection should (e.g., at more congested points in the network further along the connection path where policing is still performed) result in these frames being discarded without causing the discard of those frames that have not been labeled as discard eligible.

Figure 6:
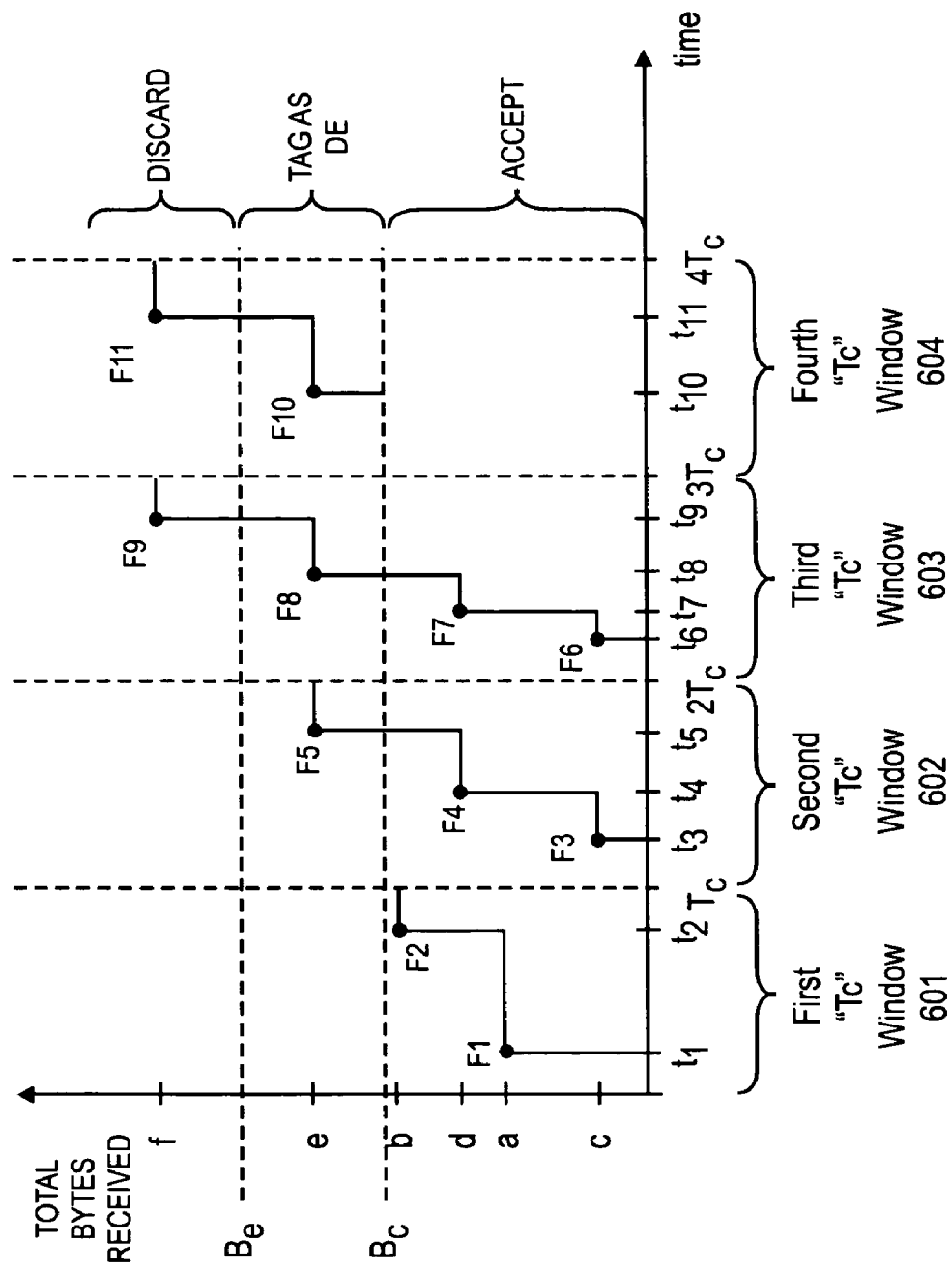
FIG. 6 shows application of the methodology of FIG. 5 to an exemplary offered load of input frames.

FIG. 6 illustrates the effect of the operation of the methodology 500 of FIG. 5 as applied to a stream of eleven frames F1 through F11 that are received over the course of four time windows 601 through 604 (where frames F1 through F9 are not tagged as discard eligible and frames F10 and F11 are tagged as discard eligible). Note that, briefly recalling the discussion of asynchronously sequenced time windows versus synchronously sequenced time windows (provided above with respect to the inquiry 302 of FIG. 3), the example observed in FIG. 6 corresponds to time windows that are sequenced in a synchronous fashion. Here, within the first time window 601, a first frame F1 of size "a" is received at time $t_1$; and, a second frame F2 of size "b-a" is received at time $t_2$. Here, because the total amount of data received within the first time window 601 is "b" and because b<Bc, each of frames F1 and F2 are accepted without being tagged as Discard Eligible or being discarded.

After the second frame is accounted for, the Bc count is equal to b. Within the second time window 602, a third frame F3 of size "c" is received at time $t_3$; and, a fourth frame F4 of size "d-c" is received at time $t_4$. Here, because the total amount of data received within the second time window 602 is "d" and because d<Bc, each of frames F3 and F4 are accepted without being tagged as Discard Eligible or being discarded. Upon the arrival of the third frame F3, the Bc count will be reset to 0; and, after the F3 is accounted for, the Bc count will be equal to "c". After the fourth frame F4 is accounted for, the Bc count will have incremented to a value of "d". With the arrival of a fifth frame F5 of size "e-d", the total amount of frame data that has been received is greater than Bc but less than Be (because Bc<e<Be). As such, the fifth frame F5 will be associated with the excess service rate; it is marked as Discard Eligible and the Be counter is incremented to a value of "e-d".

The same traffic flow that was received during the second time window 602 is initially received during the third time window 603; where, a sixth frame F6 of size "c" is received at time $t_6$, a seventh frame F7 of size "d-c" is received at time $t_7$, and an eighth frame F8 of size "e-d" is received at time $t_8$. As such, after the eighth frame F8 is accounted for, the Bc count will be "d" and the Be count will be "e-d". The third time window 603 also receives a ninth frame F9 of size "f-e" at time $t_9$. Here, as "d"+"f-e" (which corresponds to the summation of the Bc count and the size of the ninth frame F9) is greater than Bc; and, as "e-d"+"f-e" (which corresponds to the summation of the Be count and the size of the ninth frame F9) is greater than Be, the ninth frame F9 will be rejected. The depiction of FIG. 9 indicates that the addition of F9 to the total data count that is received within the third frame would exceed Bc+Be; and, as such, the ninth frame F9 is properly discarded.

Within the fourth time window 604, a tenth frame of size "e-Bc" is received at time $t_{10}$; and, an eleventh frame of size "f-e" is received at time $t_{11}$. Both of these frames are received already tagged as Discard Eligible. As such they are treated as part of the excess service rate. Because the size of the tenth frame F10 "e-Bc" is less than Be, the tenth frame is accepted. As such, after the tenth frame F10 is accounted for, the Be count will be "e-Bc". However, as depicted in FIG. 6 "e-Bc"+"f-e" is greater than Be. Because "e-Bc"+"f-e" (which corresponds to the summation of the Be count upon the arrival of the eleventh frame F11 and the size of the eleventh frame F11) is greater than Be, the eleventh frame will be discarded.

Figure 7:
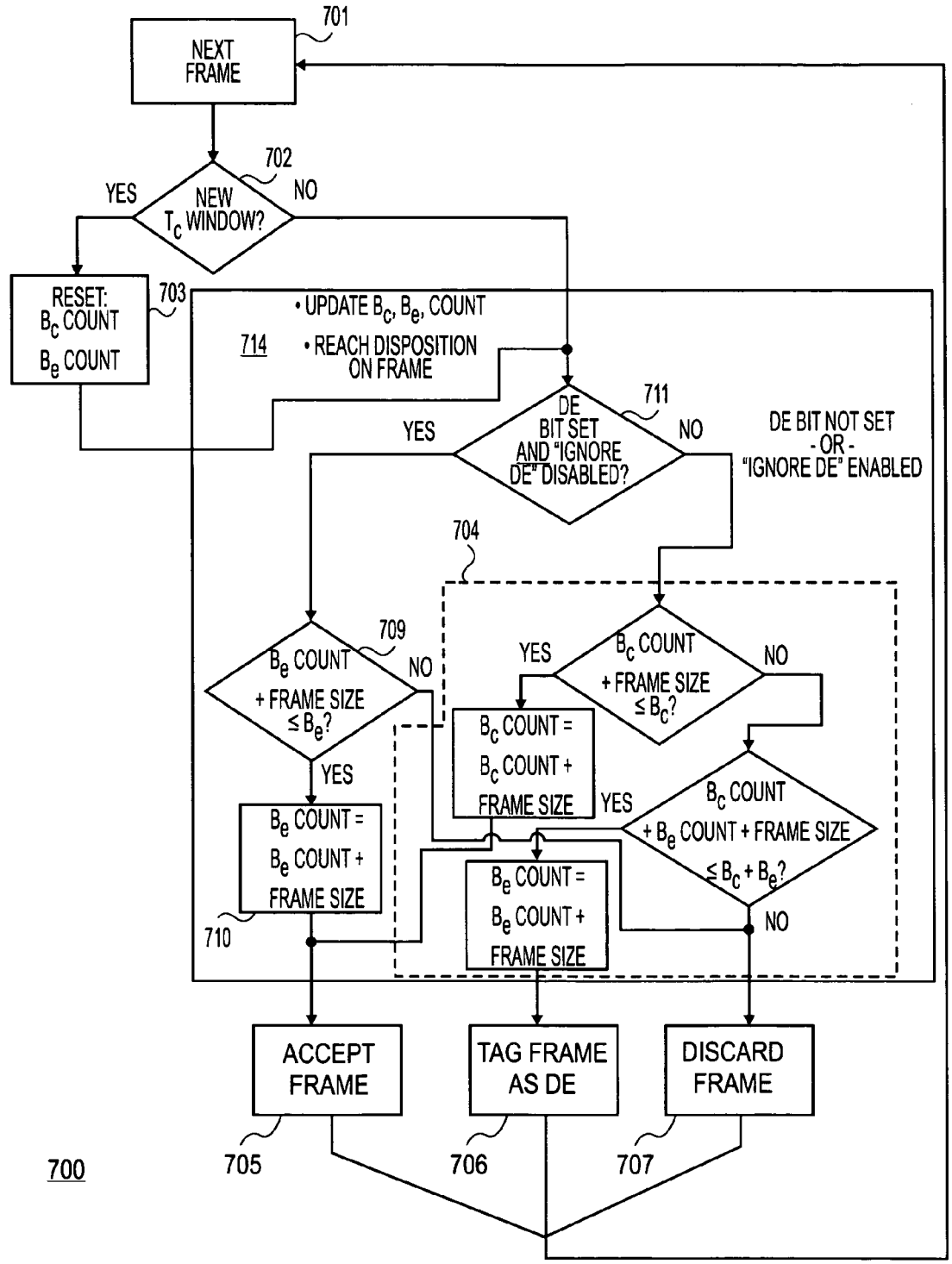
FIG. 7 shows an embodiment of a policing methodology that can be configured to effectively ignore a DE tag on an incoming data frame.

FIG. 7 shows an embodiment of another policing methodology where the manner of treatment for a received Discard Eligible frame is a changeable parameter. More precisely, an "Ignore DE" variable is associated with the policing methodology 700 of FIG. 7 that, when activated, causes the policing policy to treat a received frame that has already been tagged as Discard Eligible "as if" it was received without its Discard Eligible flag being set. Alternatively, if the "Ignore DE" variable is deactivated, the policing policy behaves according to the methodology 500 discussed above with respect to FIG. 5. Thus, if the "Ignore DE" variable is not activated, a DE tagged frame will automatically be associated with the excess service capacity of the connection (e.g., by automatically making reference to the Be count); but, if the "Ignore DE" variable is activated, a DE tagged frame can be associated with the committed service rate capacity of the connection (e.g., by making reference to the Bc count).

Ignoring the DE tag of a received frame, as alluded to just above, gives a connection the ability to change the bandwidth capacity allocation toward a particular frame. That is, a DE tagged frame (which can be viewed as being carried at the grace of the connection's permitted excess capacity) is able to consume resources devoted to the connection's committed service rate; and, likewise, a frame that is not tagged as DE (which can be viewed as being carried with the resources devoted to the connection's committed service rate) can be tagged as Discard Eligible (e.g., if it's a later arriving frame within a particular time window such as the fifth frame F5 of FIG. 6 discussed above) which would cause it to be carried with resources devoted to the connection's excess service rate.

Thus, for example, if the policing methodology of FIG. 7 were to be executed at each nodal hop in a connection across a network, one or more frames could "jump" back and forth (perhaps multiple times) between being carried by committed service rate resources and being carried by excess service rate resources. Viewing the update counter and frame disposition methodology 714 of FIG. 7, an inquiry 711 is made to see if: 1) the newly arrived frame has been tagged as Discard Eligible (DE); and, 2) the "Ignore DE" variable has not been activated. If both of these conditions are met (in which case the answer to the inquiry 711 is "YES"), the policing methodology is expected to recognize the DE tag and treat the frame as belonging to the excess resource capacity resources.

As such, methodology 709 and 710 are followed (which, correspond to methodologies 509, 510 discussed above with respect to FIG. 5) where the Be count is analyzed in order to make a disposition on the frame. If the answer to the inquiry 711 is "NO" then either: 1) the newly arrived frame has not been tagged as Discard Eligible; or, 2) the "Ignore DE" variable has been activated (in which case it is of no significance if the newly arrived frame has or has not already been tagged as Discard Eligible). Better, said frames that are tagged as Discard Eligible are treated "as if" th as frames that are not tagged as Discard Eligible. A such, a standard counter update and disposition methodology 704 (such as those 404, 504 already discussed in FIGS. 4 and 5) can be applied.

Figure 8:
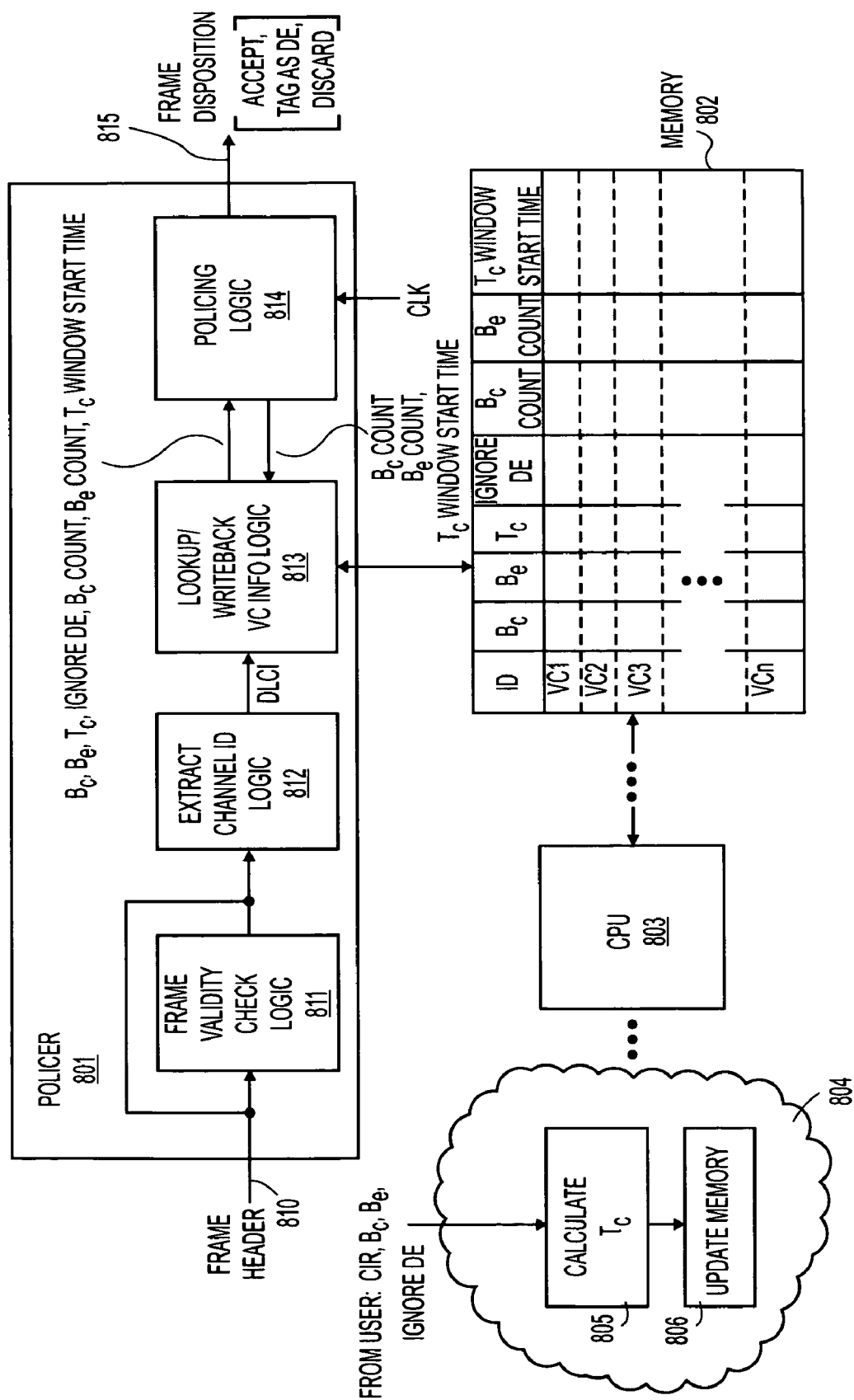
FIG. 8 shows an embodiment of a circuit that can perform the methodology of FIG. 7.

FIG. 8 shows an embodiment of a policer circuit 801 that can be used to perform any of the policing methodologies described above. The policer circuit 801 of FIG. 8 has an input 810 where frame header information is received. Frames are typically viewed as having two main parts: 1) a first part, referred to as the payload, that carries the "random customer data" for one or more users that are using the network to transport information; and 2) a second part, referred to as the header, that carries control information used by the network to properly deliver the payload (and/or maintain the network). For example, the payload may include an email that is being sent over the network and the header may include internal network signaling bits, the size of the payload, etc.

In one embodiment, the frame is divided prior to its being policed by the policer unit 801 so that the payload is buffered into a memory where it "sits" while the input policer circuit 801 is performing its processing on the header. At a later time (e.g., just before the payload is to be transmitted on an outgoing copper, fiber optic or wireless link), the payload is recombined with its header; or, a new header is fabricated and integrated with the payload. In an alternate embodiment, the header and the payload are presented at input 810 such that both header and payload information flow through the policer unit 801.

In the policer circuit embodiment 801 of FIG. 8, the extract channel ID logic stage 812 effectively extracts information from the header that identifies (or can be used to identify) the connection to which the frame belongs. So far, the discussions provided above with respect to the methodologies 300, 400, 500, 700 observed in FIGS. 3, 4, 5 and 7 have explained policing as it applies to a single connection. However, a network (as well as a single operative node within the network such as a hub, switch or router) typically carries many connections. As such, a unit responsible for handling policing activity should be able to police more than one connection. Here, the extract channel ID logic stage 812 is used to extract information that is unique to a particular connection so that the connection can be formally identified.

For Frame Relay applications, the "channel ID" that is extracted from the header may correspond to Data Link Channel ID (DLCI) information; however, to the extent the policing approaches described above could be used for other types of networking technologies (e.g., ISDN, ATM, SONET, IP, MPLS) information analogous may be used. A connection, as understood by those of ordinary skill, is a pre-configured allotment of bandwidth resources to a particular source/destination combination across a network. Generally, connection based networks can apply to any type of fundamental transmission unit (e.g., a frame, a packet or a cell).

Frames are used for time division multiplexed (TDM) transport (where, the specific time at which information is carried, referred to as time slot, is defined and recognized at a high level of intelligence within the network). By contrast, packets are used to transport information in "bundles" of information that do not need a predefined time slot. Cells (such as ATM cells), are typically viewed as small packets—but—are often carried at the physical layer via TDM transport techniques.

As such, the term "transmission unit" canl be used to refer generally to either frames, packets or cells. On a related train of thought, given that policing is a concept that extends not only to connection-based but also connectionless environments, it also noteworthy to recognize that the methodologies and articles of manufacture described herein can be applied not only to connection oriented transport environments but also to connectionless networking transport environments.

Furthermore, note that although the methodologies 300, 400, 500, 700 observed in FIGS. 3, 4, 5 and 7 are consistent with the I.370 standard described in the background, because these methodologies can be applied to other types of networking technologies, it is possible that articles of manufacture or methods of operation that are not compliant with the I.370 standard may still fall within the scope of those following claims that are not specifically limited to the I.370 standard.

Once the information that identifies (or can be used to identify) the connection to which the frame belongs is extracted by stage 812, the "lookup/writeback VC information" logic stage 813 looks up policing parameters for the connection (e.g., Bc, Be, Tc, whether or not an "Ignore DE" bit is activated) from a memory 802. Here, stage 813 effectively converts the information provided by stage 812 into an address (e.g., for SRAM or DRAM implementations of memory 802) or other data value (e.g., a comparand for a Ternary Content Addressable Memory (TCAM) that is used to extract the policing information for the appropriate connection from the memory 802. The embodiment of the contents of the memory 802 of FIG. 8 indicate that for each of n connections $VC_1$ through $VC_n$ that are policed by the policer unit 801 (noting that Frame Relay networks often term a connection as a Virtual Channel (VC)), a listing of parameter information that is "kept track of" for each connection is gathered. According to the particular embodiment of FIG. 8, the parameter information that is kept track of for each connection includes: 1) the Bc value; 2) the Bc count value; 3) the Be value; 4) the Be count value; 5) the measurement time window Tc; 6) an "Ignore DE" state (that determines whether or not the policer 801 is to ignore a DE tag for the connection; and 7) the Tc measurement time window start time.

Stage 813 retrieves the policing information from memory 802 and presents it to the policing stage 814. Here, again recalling from the discussion of FIG. 3 that Tc measurement windows can be synchronously or asynchronously orchestrated, note that the memory 802 contents of FIG. 8 may correspond to an asynchronous approach because a Tc measurement time window "start time" is recorded for each connection. In an embodiment, after the connection information is read from memory 802 and provided to the policing logic stage 814, if the policing logic stage 814 determines that the difference between the time of arrival of a newly arriving frame and the Tc measurement time window start time is greater than Tc; then, a new Tc measurement is recognized and the Tc measurement time window start time value stored in memory 802 is changed to the timestamp of the newly arrived frame.

If the difference between the time of arrival of a newly arriving frame and the Tc measurement time window start time is less than Tc; then, the newly arriving frame is recognized as being included within of a still existing measurement time window and the Tc measurement time window start time value stored in memory 802 is left unchanged. As alluded to just above, after stage 813 "looks up" the appropriate parameter information for the connection to which the frame belongs, the policing logic 814 applies the policing policy (e.g., as observed in any of FIGS. 3, 4, 5 and 7) to the specific parameter information. As such, different combinations of Bc, Bc, Tc, etc. can be used for each of connections $VC_1$ through $VC_n$.

The policing logic 814, in response to the specific parameters for the connection that were read from memory 802, updates the Bc count or Be count (as appropriate) and makes a disposition on the frame (accept, tag as DE, or discard) and presents the disposition at output 815. Note that stage 814 should receive the frame size in order to perform the policing. In one embodiment, the frame size is presented at input 810 (whether it is part of the header information or otherwise) and passed to the policing stage 814. Updated count values (and a new Tc window start time if the frame being analyzed is the first frame of a new Tc window) are returned back to stage 813 from stage 814 so that the new parameter values can be written back to the memory 802.

Note that a Central Processing Unit (CPU) 803, such as microprocessor or microcontroller, is also communicatively coupled to the memory 802 so that the connection table information observed therein can be updated or otherwise configured. Here, when connection information for a particular connection is being built into the network (so that it can later set-up the connection when appropriate), network or networking system (e.g., hub, router, switch, etc.) configuration software 804 that is executed by the CPU 803 determines 805 an appropriate time window Tc in light of the particular Bc, Be and cir parameters defined for the connection.

Thus, if a user, network manager, network management software program or networking system management software program desires a connection having a particular combination of Bc, Be and cir values, the software 804 is able to calculate 805 the appropriate Tc and update 806 memory 802 with the just calculated Tc parameter (and the Bc and Be values). Here, Tc can be calculated from the expression cir=Bc/Tc. Other information (e.g., whether or not Ignore Discard Eligible is to be activated) provided by a user, network manager, network management software or networking system management software can be updated 806 into memory 802 by the CPU 803 as well.

A range of different Tc values that can be kept track of by the policer 801 may be readily understood in light of the clock frequency (e.g., associated with the clock input CLK signal line observed in FIG. 8) that times the operation of the policing logic 814. Note that the CPU 803 may be positioned proximate to memory 802 (e.g., by being directly coupled to memory 802 or by being coupled to memory 802 through a memory controller); or, may be positioned remote from memory 802 (e.g., by being positioned on a different electronic card within the same networking system as memory 802 or by being positioned in a different networking system that communicates over a network to the networking system having memory 802).

Figure 9:
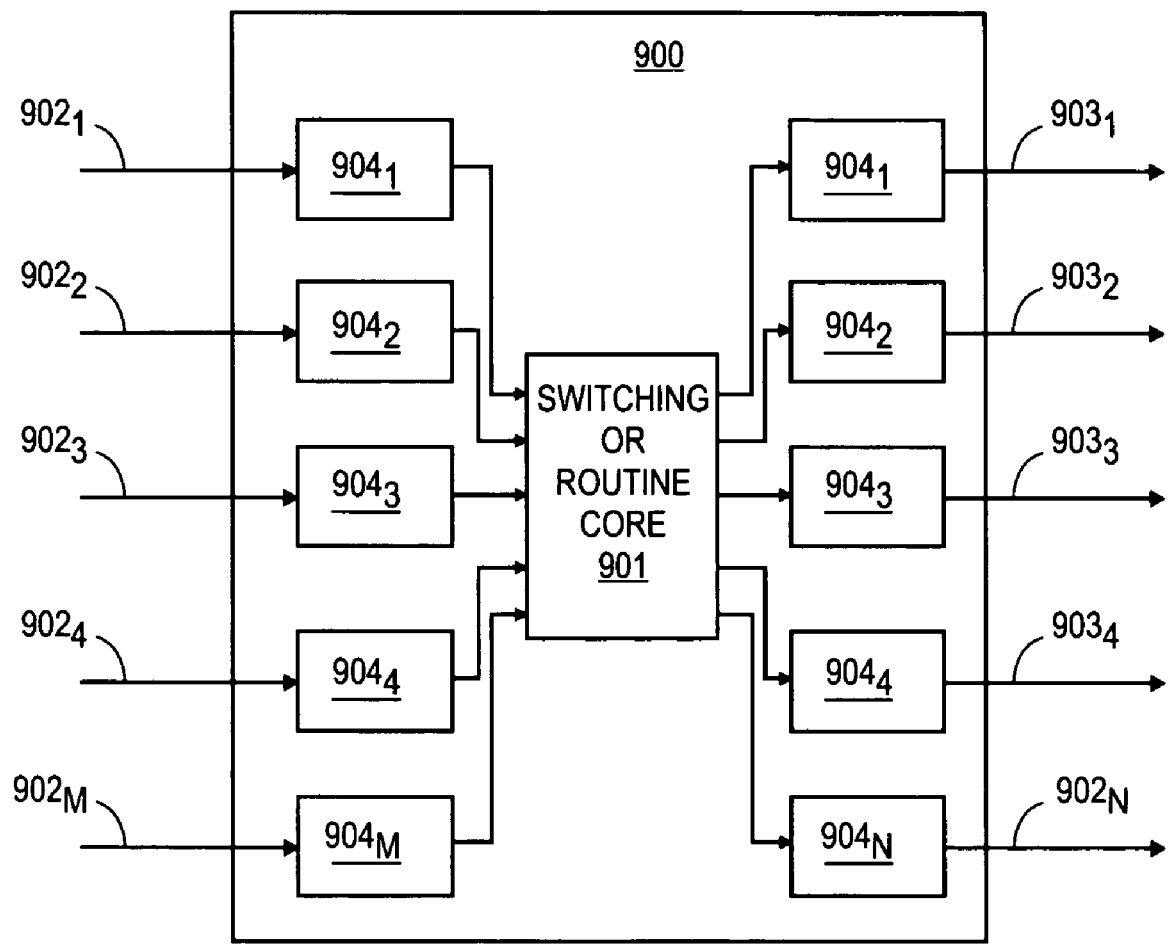
FIG. 9 shows an embodiment of a networking system that has a centralized switching and/or routing core.

FIG. 9 shows an embodiment of a networking system 900 having a centralized routing and/or switching core 901. The networking system 900 of FIG. 9 includes a plurality of ingress channels $904_1$ through $904_m$ and a plurality of egress channels $905_1$ through $905_n$. An ingress channel is responsible for receiving a transmission unit from the one or more ingress transportation mediums (e.g., one or more fiber optic cables and/or one or more copper cables). As such, the ingress channels $904_1$ through $904_m$ of FIG. 9 are shown as being respectively coupled to at least one transportation medium $902_1$ through $902_m$. Ingress channels $904_1$ through $904_m$ are also responsible for forwarding transmission units that have been received from their corresponding transport medium(s) to the switching or routing core 901.

The switching and/or routing core 901 is responsible for effectively identifying which egress channel(s) (from amongst egress channels $905_1$ through $905_n$) that a transmission unit should be sent to so that it can eventually be transmitted out of the networking system 900 on an appropriate egress transportation medium. The networking system 900 of FIG. 9 is deemed "centralized" because the egress channel identification function can be made for an ingress transmission units that has been received by any of ingress channels $904_1$ through $904_m$. An egress channel is responsible for receiving a transmission unit from the switching and/or routing core 901 and transmitting it on an egress transportation medium. As such, note that each of egress channels $905_1$ through $905_n$ are drawn as being respectively coupled to at least one egress transportation medium (e.g., again, one or more fiber optic cables and/or one or more copper cables). Generally, an ingress channel and an egress channel may share the same electronic card (or "blade") so that bi-directional traffic (i.e., ingress and egress) can be received from/transmitted to a single source/destination (e.g., another networking system that networking system 900 is coupled to).

Figure 10:
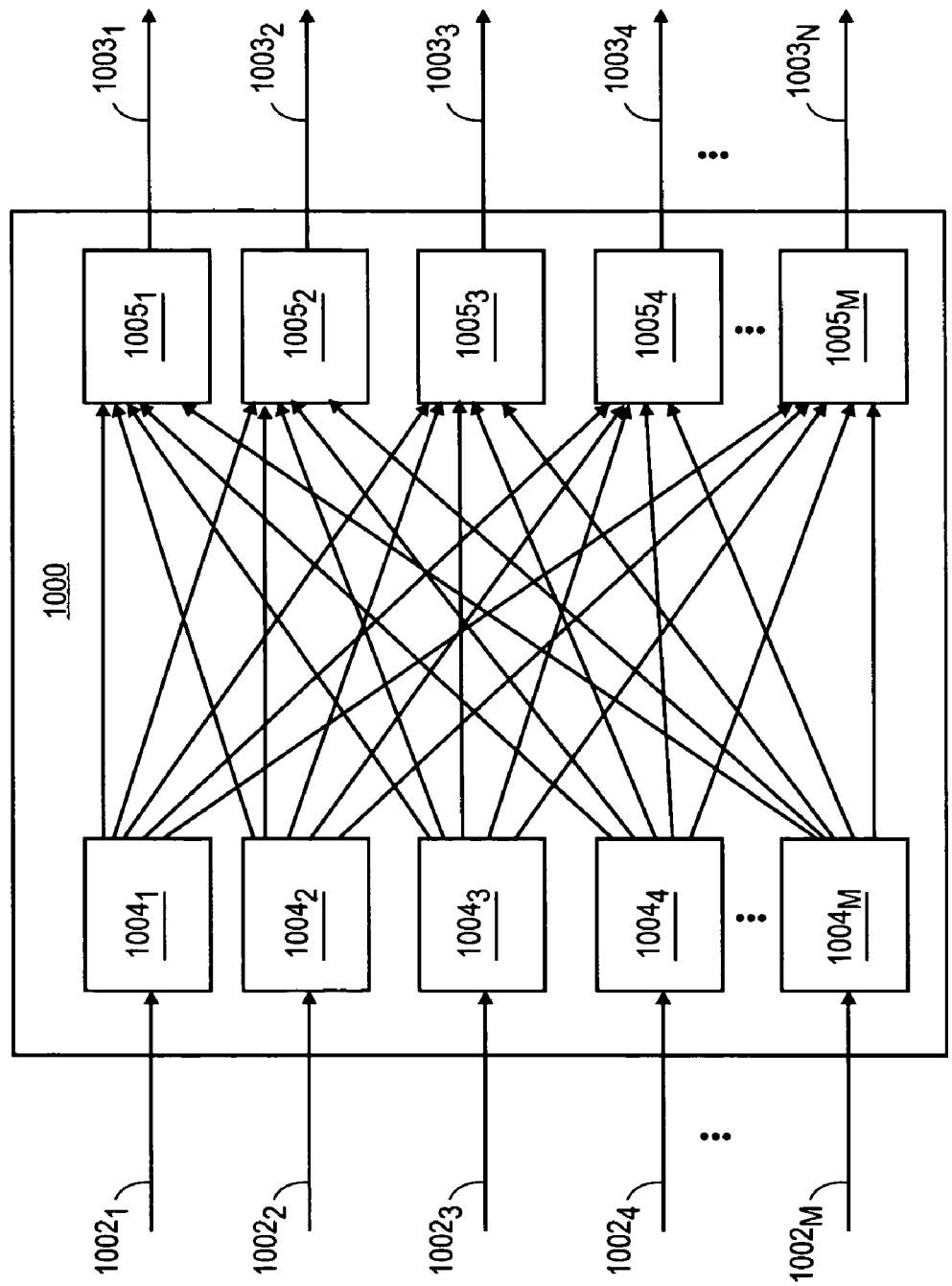
FIG. 10 shows an embodiment of a networking system that has a distributed switching and/or routing function.

FIG. 10 shows an embodiment of a networking system 1000 having a de-centralized routing and/or switching function (which may also be referred to as a "distributed" networking system). The networking system 1000 of FIG. 10 also includes a plurality of ingress channels $1004_1$ through $1004_m$ and a plurality of egress channels $1005_1$ through $1005_n$. An ingress channel is responsible for receiving a transmission unit from the one or more ingress transportation mediums (e.g., one or more fiber optic cables and/or one or more copper cables). As such, the ingress channels $1004_1$ through $1004_m$ of FIG. 10 are shown as being respectively coupled to at least one transportation medium $1002_1$ through $1002_m$. In a de-centralized approach, however, the switching and/or routing function of the overall system 1000 is distributed across various channels within the system.

For example, the switching and/or routing function may be distributed amongst each of the ingress channels $1004_1$ through $1004_m$ such that each is responsible for effectively identifying which egress channel(s) (from amongst egress channels $1005_1$ through $1005_n$) that a transmission unit it has received should be sent to (so that it can eventually be transmitted out of the networking system 1000 on an appropriate egress transportation medium). An egress channel is responsible for receiving a transmission unit from an ingress channel and transmitting it on an egress transportation medium. As such, note that each of egress channels $905_1$ through $905_n$ are drawn as being respectively coupled to at least one egress transportation medium (e.g., again, one or more fiber optic cables and/or one or more copper cables). Generally, an ingress channel and an egress channel may share the same electronic card (or "blade") so that bi-directional traffic (i.e., ingress and egress) can be received from/transmitted to a single source/destination (e.g., another networking system that networking system 1000 is coupled to).

It is important to point out that the policing methodologies described above may be executed on a channel (as an extension of the functionality of a channel as provided just above) or; a switching and/or routing core (as an extension of the functionality of a switching and/or routing core as provided just above). The policing function may also be performed in hardware (e.g., as described above with respect to FIG. 8); or, in software.

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a circuit description formatted in the VHSIC Hardware Description Language (VHDL) language, Verilog language or SPICE language. Some circuit description examples include: a behavioral level description, a register transfer level (RTL) description, a gate level netlist and a transistor level netlist. Machine readable media may also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the Central Processing Unit (CPU) of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
   resetting a first count and resetting a second count if a first transmission unit is recognized as being within a new measurement time window, said first transmission unit having a size;
   incrementing said first count by said first transmission unit size and by the size of each subsequent transmission unit that is received within said new measurement time window after said first transmission unit so long as said first count does not exceed a maximum allowable value for said first count; and
   checking if a maximum value for said second count will be exceeded if it is incremented by a second transmission unit size, said second transmission unit having been received within said new measurement time window, said checking in response to a determination that said first count would have exceeded said first count maximum allowable value if said first count were incremented by said second transmission unit size, wherein the method is used to police a network.

2. The method of claim 1 wherein said transmission unit further comprises a frame.

3. The method of claim 1 wherein said transmission unit further comprises a packet.

4. The method of claim 1 wherein said transmission unit further comprises a cell.

5. The method of claim 1 further comprising incrementing said second count by said second transmission unit size in response to said checking resulting in a second determination that said second count maximum value would be not be exceeded if said second count were incremented by said second transmission unit size.

6. The method of claim 5 further comprising tagging said second transmission unit as Discard Eligible.

7. The method of claim 6 further comprising discarding a third transmission unit that was received after said second transmission unit because incrementing said second count value by said third transmission unit size would have caused said second count value to exceed said maximum allowable value for said second count.

8. The method of claim 1 wherein said first count maximum allowable value divided by said measurement time window size corresponds to a committed service rate for a connection that said method is policing.

9. The method of claim 7 wherein said second count maximum value divided by said measurement time window size corresponds to an excess service rate above said committed service rate that is permitted by a connection.

10. The method of claim 1 wherein said recognition that said first transmission unit is within a new measurement time window further comprises taking a difference between a time of arrival for said first transmission unit and a start time for a preceding measurement time window, said difference being greater than said measurement time window size.

11. The method of claim 10 wherein said start time for a preceding measurement time window is the same as the arrival time that was recognized for a preceding transmission unit that was received prior to said first transmission unit.

12. The method of claim 11 further comprising changing said start time to a recognized arrival time for said first transmission unit.

13. The method of claim 1 wherein each of said transmission units whose size was reflected in said incrementing of said first count was not tagged as Discard Eligible when received.

14. The method of claim 13 further comprising accepting each of said transmission units whose size was reflected in said incrementing of said first count.

15. The method of claim 1 wherein at least one of said transmission units whose size was reflected in said incrementing of said first count was tagged as Discard Eligible when received.

16. The method of claim 15 further comprising accepting each of said transmission units whose size was reflected in said incrementing of said first count.

17. A method, comprising:
setting a Discard Eligible tag on a received transmission unit associated with an excess service capacity of a connection;
disregarding the Discard Eligible tag on the received transmission unit based on a discard eligible variable being activated, the received transmission unit being associated with a committed service rate capacity of the connection; and
acknowledging the Discard Eligible tag on the received transmission unit based on the discard eligible variable being inactivated, the received transmission unit being associated with the excess service capacity of the connection, wherein the method is used to police a network.

18. The method of claim 14 further comprising resetting a first count value and a second count value in response to said transmission unit having arrived more than a measurement time window size after a start time for a measurement time window.

19. The method of claim 15 further comprising resetting a measurement time window start time parameter to an arrival time of said transmission unit.

20. The method of claim 14 further comprising accepting said transmission unit because the maximum allowance value of the first count was not exceeded.

21. An apparatus, comprising:
a) a lookup stage that retrieves policing information from a memory in response to being provided information derived from a header of a transmission unit, said transmission unit having a size, said policing information further comprising:
1) a first count;
2) a first count maximum allowable value;
3) a second count;
4) a second count maximum allowable value;
5) a measurement time window size; and,
b) a policing stage that:
1) increments said first count by said transmission unit size if said transmission unit was received within a committed service rate, said committed service rate being reached if said first count reaches said first count maximum allowable value within said measurement time window size;
2) increments said second count by said transmission unit size if said transmission unit was received within a permitted excess service rate, said excess service rate being reached if said second count reaches said second count maximum allowable value within said measurement time window size, wherein the apparatus is used to police a network.

22. The apparatus of claim 21 wherein said policing information further comprises an Ignore Discard Eligible parameter, said Ignore Discard Eligible parameter, if activated, causing the policing stage to treat said transmission unit as if it were received without a Discard Eligible tag even if it said transmission unit was received with a Discard Eligible tag.

23. The apparatus of claim 21 wherein the lookup stage and the policing stage are located within a networking system at a location where transmission units that are received by said networking system can be policed.

24. The apparatus of claim 23 wherein said networking system is a centralized networking system.

25. The apparatus of claim 23 wherein said networking system is a distributed networking system.

26. The apparatus of claim 21 wherein said policing information further comprises a measurement time window start time parameter, and wherein said policing stage determines if said transmission unit is a first transmission unit within a new transmission window by taking a difference between said measurement time window start time parameter and a time at which said transmission unit was received.

27. The apparatus of claim 21 wherein said apparatus further comprises a centralized routing core that routes transmission units, said transmission unit being one of said transmission units.

28. The apparatus of claim 21 wherein said apparatus further comprises a centralized switching core that switches transmission units, said transmission unit being one of said transmission units.

29. The apparatus of claim 21 wherein said apparatus routes or switches transmission units in a distributed fashion, said transmission unit being one of said transmission units.

30. An apparatus, comprising:
means for resetting a first count and resetting a second count if a first transmission unit is recognized as being within a new measurement time window, said first transmission unit having a size;
means for incrementing said first count by said first transmission unit size and by the size of each subsequent transmission unit that is received within said new measurement time window after said first transmission unit so long as said first count does not exceed a maximum allowable value for said first count; and
means for checking if a maximum value for said second count will be exceeded if it is incremented by a second transmission unit size, said second transmission unit having been received within said new measurement time window, said checking in response to a determination that said first count would have exceeded said first count maximum allowable value if said first count were incremented by said second transmission unit size, wherein the apparatus is used to police a network.

31. The apparatus of claim 30 wherein said transmission unit further comprises a frame.

32. The apparatus of claim 30 wherein said transmission unit further comprises a packet.

33. The apparatus of claim 30 wherein said transmission unit further comprises a cell.

34. The apparatus of claim 30 further comprising means for incrementing said second count by said second transmission unit size in response to said checking resulting in a second determination that said second count maximum value would be not be exceeded if said second count were incremented by said second transmission unit size.

35. The apparatus of claim 34 further comprising tagging said second transmission unit as Discard Eligible.

36. The apparatus of claim 35 further comprising means for discarding a third transmission unit that was received after said second transmission unit because incrementing said second count value by said third transmission unit size would have caused said second count value to exceed said maximum allowable value for said second count.

37. The apparatus of claim 30 wherein said first count maximum allowable value divided by said measurement time window size corresponds to a committed service rate for a connection that said method is policing.

38. The apparatus of claim 37 wherein said second count maximum value divided by said measurement time window size corresponds to an excess service rate above said committed service rate that is permitted by said connection.

* * * * *